United States Patent
Styles

(10) Patent No.: US 7,912,929 B2
(45) Date of Patent: *Mar. 22, 2011

(54) MANAGING CLIENT CONFIGURATION SETTINGS IN A NETWORK ENVIRONMENT

(75) Inventor: Brian Styles, Delray Beach, FL (US)

(73) Assignee: Scriptlogic Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/770,354

(22) Filed: Apr. 29, 2010

(65) Prior Publication Data

US 2010/0217846 A1 Aug. 26, 2010

Related U.S. Application Data

(63) Continuation of application No. 11/619,396, filed on Jan. 3, 2007, now Pat. No. 7,801,975, which is a continuation of application No. 10/700,616, filed on Nov. 4, 2003, now Pat. No. 7,293,087, and a continuation-in-part of application No. 09/489,759, filed on Jan. 21, 2000, now Pat. No. 6,871,221.

(60) Provisional application No. 60/424,112, filed on Nov. 4, 2002.

(51) Int. Cl.
*G06F 15/177* (2006.01)
(52) U.S. Cl. .......................... 709/221; 709/220; 709/223
(58) Field of Classification Search .......... 709/220–221, 709/223, 225
See application file for complete search history.

(56) References Cited

U.S. PATENT DOCUMENTS

| | | | |
|---|---|---|---|
| 5,414,833 A | 5/1995 | Hershey et al. | 726/22 |
| 5,832,503 A | 11/1998 | Malik et al. | |
| 5,838,907 A | 11/1998 | Hansen | |
| 5,838,918 A | 11/1998 | Prager et al. | |
| 5,842,002 A | 11/1998 | Schnurer et al. | 703/21 |
| 5,926,463 A | 7/1999 | Ahearn et al. | |
| 5,974,547 A | 10/1999 | Klimenko | |
| 5,999,741 A | 12/1999 | May et al. | |
| 6,012,088 A * | 1/2000 | Li et al. | 709/219 |
| 6,029,196 A | 2/2000 | Lenz | |
| 6,092,196 A | 7/2000 | Reiche | |
| 6,094,681 A | 7/2000 | Shaffer et al. | 709/224 |
| 6,108,028 A | 8/2000 | Skarbo et al. | 348/14.03 |

(Continued)

OTHER PUBLICATIONS

Copyright Application dated Oct. 20, 1998 for NTScript.

*Primary Examiner* — Faruk Hamza
(74) *Attorney, Agent, or Firm* — Jon A. Gibbons; Fleit Gibbons Gutman Bongini & Bianco PL

(57) ABSTRACT

A GUI (Graphical User Interface) Manager is used by a network administrator to fill-in predefined templates. The administrator does not need to compile, debug or write a single line of scripting code. The GUI manager has a "select the box" and "point and click" and "fill-in the blank" approach for selecting computer settings. The predefined configuration and/or template(s) are used by a logon script program on a client system to manage the configuration of resources on at least one client. There are three levels of resources that can be managed. The first type of resource is an operating system. The second type of resource is an application resource. And the third type of resource is to redirect a resource on the client to a resource on a network such as a drive letter mapping.

9 Claims, 13 Drawing Sheets

U.S. PATENT DOCUMENTS

| | | | |
|---|---|---|---|
| 6,209,031 B1 | 3/2001 | Casey et al. | |
| 6,226,751 B1 | 5/2001 | Arrow et al. | |
| 6,243,747 B1 | 6/2001 | Lewis et al. | |
| 6,252,858 B1 | 6/2001 | Inoue | |
| 6,256,635 B1 | 7/2001 | Arrouye et al. | |
| 6,279,128 B1 | 8/2001 | Arnold et al. | 714/49 |
| 6,314,565 B1 | 11/2001 | Kenner et al. | |
| 6,324,543 B1 | 11/2001 | Cohen et al. | |
| 6,330,710 B1 | 12/2001 | O'Neil et al. | |
| 6,345,294 B1 | 2/2002 | O'Toole et al. | |
| 6,347,336 B1 | 2/2002 | Song et al. | 709/223 |
| 6,347,398 B1 | 2/2002 | Parthasarathy et al. | |
| 6,349,306 B1 | 2/2002 | Malik et al. | |
| 6,384,853 B1 | 5/2002 | Shaffer et al. | 715/867 |
| 6,442,682 B1 | 8/2002 | Pothapragada et al. | |
| 6,449,642 B2 | 9/2002 | Bourke-Dunphy et al. | |
| 6,466,972 B1 | 10/2002 | Paul et al. | |
| 6,493,751 B1 | 12/2002 | Tate et al. | 709/221 |
| 6,771,661 B1 | 8/2004 | Chawla et al. | 370/468 |
| 6,834,301 B1 | 12/2004 | Hanchett | 709/223 |
| 6,922,722 B1 * | 7/2005 | Mann et al. | 709/220 |
| 6,934,301 B2 | 8/2005 | Jordan | 370/466 |
| 6,941,359 B1 | 9/2005 | Beaudoin et al. | 709/221 |
| 6,957,263 B2 | 10/2005 | Galou et al. | 709/227 |
| 6,963,916 B1 | 11/2005 | Pugaczewski et al. | 709/227 |
| 6,985,944 B2 | 1/2006 | Aggarwal | 709/224 |
| 7,024,548 B1 | 4/2006 | O'Toole, Jr. | 713/1 |
| 7,080,372 B1 | 7/2006 | Cole | 717/173 |
| 7,082,464 B2 | 7/2006 | Hasan et al. | 709/223 |
| 7,120,685 B2 | 10/2006 | Ullmann et al. | 709/224 |
| 7,136,912 B2 | 11/2006 | Hotti | 709/223 |
| 7,139,819 B1 | 11/2006 | Luo et al. | 709/223 |
| 7,363,339 B2 * | 4/2008 | Delany et al. | 709/202 |
| 7,562,382 B2 * | 7/2009 | Hinton et al. | 726/2 |
| 7,568,095 B2 * | 7/2009 | Thornton et al. | 713/156 |
| 7,698,375 B2 * | 4/2010 | Hinton et al. | 709/217 |
| 7,840,658 B2 * | 11/2010 | Sinn | 709/223 |
| 2002/0152254 A1 * | 10/2002 | Teng | 709/100 |
| 2006/0021017 A1 * | 1/2006 | Hinton et al. | 726/10 |

* cited by examiner

View Pane

Application Launcher

| Description | Filespec | Args | Cycle | Cycle Data | Frequency | Timing | Hide | Wait | Admin | Validation |
|---|---|---|---|---|---|---|---|---|---|---|
| | testapp | arg | E | * | E | After | Visible | Continue | User | /G=!Accounting |

Settings | Validation Logic

Validation

Type ☐ NOT   Value
Group Membership ▼   !Accounting Group ▼ ▣

[ Add ]   [ Remove ]   ● OR  ○ AND

| Operator | Type | Value | Validation |
|---|---|---|---|
| IF | Group | !Accounting Group | |
| AND NOT | Primary Group | !Human Resources Group | |
| OR | UserOU | RD-* | |
| | | | |

← 702

Class
☑ Desktop
☑ Notebook
☑ Tablet PC
☐ Term Serv Client
☑ Member Server
☑ Domain controller

OS
☑ 95  ☐ NT
☑ 98  ☑ 2000
☑ Me  ☑ XP

Connection
☑ LAN  ☑ Dial-up

FIG. 7

```
function slMultiCompare($StringA,$StringB)
  ; SL platforms: 4.01 ; LastRev: 2002-Aug-21
  ; dependencies: slWildCompare(), slQuestionCompare()
  ; compares one string to another, and supports '*' and '?' as a wildcards
  ; stringA: constant string
  ; stringB: variable string
  ;          stringB can contain wildcards '*' and '?'
  ;          stringB can be an array or a single string containing multiple elements,
each separated by a semi-colon
  dim $ArrayB, $elementB
  $slMultiCompare=0 ; default false
  if $StringA and $StringB
    $StringA=trim($StringA)
    if vartype($StringB)<8192 ; StringB is a string
      $ArrayB=split($StringB+';',';') ; remove last ; added for split to achieve at least
one element
      redim preserve $ArrayB[ubound($ArrayB)-1]
    else ; StringB is an array
      $ArrayB=$StringB
    endif
    for each $ElementB in $ArrayB
      $ElementB=trim($elementB)
      select
        case $ElementB='*' ; single wildcard - matches everything
          $slMultiCompare=1
          return ; true
        case $StringA=$ElementB
          $slMultiCompare=1
          return ; true
        case instr($ElementB,'*')
          if slWildCompare($StringA,$ElementB)
            $slMultiCompare=1
            return ; true
          endif
        case instr($ElementB,'?')
          if slWildCompare($StringA,$ElementB)
            $slMultiCompare=1
            return ; true
          endif
        case 1 ; no wildcards and we've already determined that strings don't match
          ; do nothing - proceed to next array element
      endselect
    next
  endif
endfunction function slWildCompare($StringA,$StringB)
  ; SL platforms: 4.01 ; LastRev: 2002-Aug-21
  ; dependencies: slQuestionCompare()
  ; Do not call this function directly -- use slMultiCompare() instead
  ; compares one string to another, and supports wildcards
  ; stringA: constant string
  ; stringB: variable string (can contain wildcards '*' and '?')
  ; could add case-sensitivity option in future...
  dim $LenStringA, $lenStringB, $QuestionLoc, $AsteriskLoc
  dim $GlobArray, $LenGAE, $lenGAEfirst, $lenGAElast, $GAUB
  $slWildCompare=0 ; default to no match
  if $StringA and $StringB
    $StringA=trim($StringA)
    $LenStringA=len($StringA)
    if $StringB='*' ; single wildcard - matches everything
```

FIG. 9A

```
$slWildCompare=1
    return ;true
  endif
  if $StringA=$StringB ; exact match
    $slWildCompare=1
    return ;true
  else ; not exact match
    $asteriskLoc=instr($StringB,'*')
    $questionLoc=instr($StringB,'?')
    if not ($asteriskLoc or $questionLoc)
      return ; false: no wildcards - no reason to continue
    endif
    $lenStringB=len($StringB)
    $GlobArray=split($StringB+'*','*')
    $GAUB=ubound($GlobArray)-1
    redim preserve $GlobArray[$GAUB] ; remove last * added for split to achieve at
least one element
    ; first Glob - special case test
    $lenGAEfirst=len($GlobArray[0])
    if not slQuestionCompare(left($StringA,$lenGAEfirst),$GlobArray[0])
      return ; false
    endif
    ; last Glob - special case test
    $lenGAElast=len($GlobArray[$GAUB])
    if not slQuestionCompare(right($StringA,$lenGAElast),$GlobArray[$GAUB])
      return ; false
    endif
    $StringA=substr($StringA,$lenGAEfirst+1,len($StringA)-$lenGAElast) ; removed final
-1 (was failing on *abc*)
    if $GAUB<2 ; less than 2 Globs - preceeding special case tests determined result
      $slWildCompare=1
      return ; true
    endif
    for $index=1 to $GAUB-1 ; process elements 2 through next-to-last
      $lenGAE=len($GlobArray[$index])
      if len($StringA)<$lenGAE
        return ; false
      endif
      while len($StringA) and not
slQuestionCompare(left($StringA,$lenGAE),$GlobArray[$index])
        $StringA=substr($StringA,2)
      loop
      if not slQuestionCompare(left($StringA,$lenGAE),$GlobArray[$index])
        return ; false
      else
        $StringA=substr($StringA,$lenGAE+1)
      endif
    next
    $slWildCompare=1
  endif
 endif
endfunction function slQuestionCompare($StringA,$StringB)
  ; SL platforms: 4.01 ; LastRev: 2002-Aug-21
  ; Do not call this function directly -- use slMultiCompare() or slWildCompare() instead
  ; compares one string to another, and supports '?' as a wildcard
  ; StringA - constant
  ; StringB - variable
  dim $index, $StringBchar
  $slQuestionCompare=1
  if $StringA and $StringB
    if $StringA=$StringB
      $slQuestionCompare=1 ; true
```

FIG. 9B

B/C ← ————————————————————————————— → B/C

```
    else
          $slQuestionCompare=0 ; default no match
          if not instr($StringB,'?') ; no question marks
            return ; false
          else
            ; length of both strings must be same to continue
            if len($StringA)<>len($StringB) ; different lengths
              return ; false
            endif
            ; perform comparison character-by-character
            for $index=1 to len($StringA)
              $StringBchar=substr($StringB,$index,1)
              if (substr($StringA,$index,1)<>$StringBchar) and $StringBchar<>'?'
                return ; false
              endif
            next
            $slQuestionCompare=1 ; true
          endif
      endif
    endif
endfunction
```

```
    $CurrentPowerProfileValue=readvalue('HKCU\Control
Panel\PowerCfg','CurrentPowerPolicy')
    $CurrentPowerProfileName=readvalue('HKCU\Control
Panel\PowerCfg\PowerPolicies\'+$CurrentPowerProfileValue,'Name')
    select
        case instr($SiProcessorNameString,'mobile') ; Mobile CPU type
            ; highly confident that this is a portable computer!
            ; platforms tested on: XP
            $ClientClassRule='rule 1: Mobile CPU type -> portable'
            $SiComputerType='Portable'
            $ClientClass='Port'
        case @INWIN=1 and
0+readvalue('HKLM\System\CurrentControlSet\Services\pcmcia','Start')=4 ; NT & PCMCIA
kernel driver not started
            ; highly confident that this is a desktop computer!
            ; platforms tested on: NT, 2000, XP
            $ClientClassRule='rule 2: PCMCIA driver not started (NT) -> desktop'
            $SiComputerType='Desktop'
            $ClientClass='Desk'
        case @INWIN=2 and
''+readvalue('HKLM\System\CurrentControlSet\Control\InstalledFiles','PCCard.vxd')='' ; 9x
& PCMCIA kernel driver not started
            ; highly confident that this is a desktop computer!
            ; platforms tested on: 95, 98, Me
            $ClientClassRule='rule 3: PCMCIA driver not started (9x) -> desktop'
            $SiComputerType='Desktop'
            $ClientClass='Desk'
        case $OS<>'NT' and $SiBatteryState=128 ; no battery present
            ; fairly confident that this is a desktop computer (it could be a laptop with the
battery removed).
            ; platforms tested on:
            $ClientClassRule='rule 4: No system battery deteted -> desktop'
            $SiComputerType='Desktop'
            $ClientClass='Desk'
        case slGetServiceStartup('UPS')='Automatic' ; Built-in UPS service on 2000/XP
            ; highly confident that this is a desktop computer (who'd install UPS software on
a laptop?)
            ; platforms tested on: XP, 2000
            $ClientClassRule='rule 5: built-in UPS service is automatic -> desktop'
            $SiComputerType='Desktop'
            $ClientClass='Desk'
        case slGetServiceStartup('LiebertM')='Automatic' ; Liebert MultiLink 3.0
            ; highly confident that this is a desktop computer (who'd install UPS software on
a laptop?)
            ; platforms tested on: XP, 2000
            $ClientClassRule='rule 6: Liebert MultiLink UPS service is automatic -> desktop'
            $SiComputerType='Desktop'
            $ClientClass='Desk'
        case slGetServiceStartup('APCPBEAgent')='Automatic' ; APC PowerChute Business
Edition 6.1
            ; highly confident that this is a desktop computer (who'd install UPS software on a
laptop?)
            ; platforms tested on: XP, 2000
            $ClientClassRule='rule 7: APC PowerChute Business Edition UPS service is
automatic -> desktop'
            $SiComputerType='Desktop'
            $ClientClass='Desk'
        case slGetServiceStartup('APC UPS Service')='Automatic' ; APC PowerChute Personal
Edition
            ; highly confident that this is a desktop computer (who'd install UPS software on
a laptop?)
```

↓ A/B                                                    ↓ A/B

```
        ; platforms tested on: XP, 2000
        $ClientClassRule='rule 8: APC PowerChute Business Edition UPS service is
automatic -> desktop'
        $SiComputerType='Desktop'
        $ClientClass='Desk'
    case $CurrentPowerProfileName='APC USB UPS'
        ; highly confident that this is a desktop computer (who'd install UPS software on
a laptop?)
        ; ***$$ what about other UPS brands? What about APC non-USB models?
        ; platforms tested on: XP, 2000
        $ClientClassRule='rule 9: APC USB UPS power scheme -> desktop'
        $SiComputerType='Desktop'
        $ClientClass='Desk'
    case $CurrentPowerProfileName='Portable/Laptop' or $CurrentPowerProfileName='Max
Battery'
        ; somewhat confident that this is a portable computer. This setting is user
profile-specific and can be changed
        ; platforms tested on: XP, 2000
        $ClientClassRule='rule 10: portable/laptop or max battery power scheme ->
portable'
        $SiComputerType='Portable'
        $ClientClass='Port'
    case 1
        ; At this point, here is what we know:
        ;   Not a mobile CPU type
        ;   The Portable/Laptop power scheme is not selected
        ;   It does have PCMCIA sockets.
        ;   9x, 2000 & XP systems do not have a battery present
        ;
        $ClientClassRule='rule 11: default -> portable'
        $SiComputerType='Portable'
        $ClientClass='Port'
    endselect
```

FIG. 11B

MANAGING CLIENT CONFIGURATION SETTINGS IN A NETWORK ENVIRONMENT

CROSS-REFERENCE TO RELATED APPLICATIONS

This non-provisional application is a continuation of U.S. patent application Ser. No. 11/619,396 filed Jan. 3, 2007, entitled "MANAGING CLIENT CONFIGURATION SETTINGS IN A NETWORK ENVIRONMENT," which is a continuation of U.S. patent application Ser. No. 10/700,616 filed Nov. 4, 2003, entitled "EVENT-BASED APPLICATION FOR PERFORMING COFIGURATION CHANGES IN A NETWORKED ENVIRONMENT," now U.S. Pat. No. 7,293,087, which is based on Provisional Patent Application Ser. No. 60/424,112 with inventor Brian Styles entitled "EVENT-BASED APPLICATION FOR PERFORMING CONFIGURATION CHANGES IN A NETWORKED ENVIRONMENT," filed Nov. 4, 2002 which is a continuation-in-part of U.S. Pat. No. 6,871,221 with inventor Brian Styles entitled "METHOD AND APPARATUS TO MANAGE NETWORK CLIENT LOGON SCRIPTS USING A GRAPHICAL MANAGEMENT AND ADMINISTRATION TOOL" filed Jan. 21, 2000. Each of the above-referenced applications are hereby incorporated by reference in their entirety.

COPYRIGHT NOTICE

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

The invention disclosed broadly relates to the field of client-server computing and/or server centric computing, and more particularly relates to the field of desktop administration and network management tools.

2. Description of the Related Art

The field of client-server computing continues to grow. Networks such as LANs, Intranets, the Internet and the World-Wide Web are based on client-server topologies. The growth of client-server computing has lead to an increased demand on the administration of networks by administrators.

For each client, the administrators must set each shared applications the client will have access to, define the desktop layout and security, and other client configurations. As an example, one application from Microsoft Corporation called Outlook often requires client user configuration guided by an installation wizard. However, many computer users may not know what to enter for the wizard or may provide incorrect values, so network administrators have historically made use of logon scripts to provide a pre-configured environment.

The term "logon script" is the set of executables or scripts or batch files that a client system runs during logon, which may be locally stored by the client and retrieved from a server that defines the resources, security and the configuration for each client. Operating systems 306 such as Microsoft Windows NT4.0/2000/2003 provide some settings for applications that can be configured automatically during the clients' boot-up and login in the client default profile or through system policies. However, some of the settings for applications and resources, such as mapping a drive letter to a network resource or connecting to a network printer or automatic software deployment, which fall between the cracks of what Windows NT allows administrators to configure automatically for each client. For these settings, custom logon scripts files or custom executables have been used.

Logon scripts have been around with products such as Novell Inc.'s Netware™ products for years. The Novell products are not the only scripting products available, and other scripts are possible in operating system 306 such as Windows NT 4.0. Logon scripts are very useful tools in the network environment. Logon scripts automatically run during the logon process and can help set up the client working environment by copying files, creating connections, and launching applications. The logon process can be summarized as the sequence events between the time a user enters their authentication information (e.g., userid and password) and the time the computer is ready to be used (e.g. the desktop is loaded and the user can begin work).

In fact, it is common today for most corporate networks to use logon scripts because they assist with centralized administration. However logon scripts are difficult to create, edit and administer. Also, logon scripts in certain environments such as Windows NT/2000/2003 can be assigned to a single user or multiple users.

Although these logon scripts are useful for helping to administer and manage networks, they are not without their shortcomings. One shortcoming with logon scripts today is that they are written in a special scripting language or DOS batch files and must be hand edited and debugged. The requirement to write and debug logon scripts across an enterprise network installation is time consuming and expensive. Accordingly, a need exists for a method and apparatus to provide a centralized configuration.

Another shortcoming with currently available solutions is that they are cumbersome to manage across several clients. To centrally manage clients, network administrators make use of batch files and scripts that are customized to each client. The process of managing custom batch files for each user and/or computer is tedious. Moreover, the currently available solutions such as logon scripting languages, cannot support the complex features of network administration. More complex feature such as group memberships, printer deployment, proxy server access, MS Office paths, service packs, anti-virus updates, policies and automatic Outlook/Exchange mail profile creation are not supported in many logon scripts. The administrators of large networks are then forced to make a difficult choice of either learning a more complex logon scripting language and attendant debugger or forego supporting more complex features centrally in the network administration. Accordingly, a need exists for a method and an apparatus to provide the administration of a plurality of clients across a network the ability to able to handle more complex support features without the need to debug a single line of code.

Still another shortcoming with currently available solutions is that there is no method to validate if a desired setting is proper for a given user on a given client system. Stated differently, certain resources should not be set if a given group, a selected operating system and a selected connection method is not met. For example, a logon script may request a certain drive letter for the client, say drive letter "O" to be mapped to a particular resource, say a CD ROM on a server, however this can only happen if the user of the client is a member of a particular group. Today, no method exists to verify one or more local run-time environmental conditions on a client. The solution employed by Microsoft in its Windows Server 2000 and 2003 line of products is the use of Group Policy Objects at the server. This Group Policy Object solution although useful, is not able to make determinations of local run-time environments on the client. Therefore it is not possible to determine such things using group policies as host address, subnets, MAC, primary groups, whether terminal services is running, what third party applications are running, and whether the client system is a portable or desktop hardware configuration. This type of granularity of the client system local run-time environment is not available. Accordingly, a need exists for a method to permit clients to validate local-run time environments prior to the application of one or more desktop settings on a client system.

Yet still another shortcoming with currently available solutions and management applications is the inability to perform updates based on an event or activity. For example, it would not be useful to try to connect to a network drive on a portable device such as laptop if the network is not available. Warning messages that the network is not available often confuses users rather than assist them.

Still, another shortcoming with currently available solutions and management applications is the inability to use wildcards such length invariant wildcards such as "*" i.e., the asterisk or position specific wildcards such as i.e., "?" the question mark. The use of wildcards enables easier management of a group of computers, such as clients, within in a predetermined IP address range.

SUMMARY OF THE INVENTION

A system, a computer readable medium and a method in a client-server environment, to manage a configuration of resources on client systems. This includes receiving one or more predetermined events along with one or more local run-time environmental conditions along with one or more user selectable settings. The events, the settings and the environmental conditions are previously set graphically using a graphical user interface with one or more user selectable selections therein on a server. These events, local run-time environmental conditions along with settings are delivered to a client system. A monitoring agent on the client system is used to detect when one or more predetermined events occur. When an event occurs, a test is made to determine if one or more local run-time environmental conditions are met, and if the conditions are met then the agent automatically applies one or more selectable configuration settings on the client system.

In another embodiment, a test is made if the client system is a portable computer as opposed to a desktop computer. When an event occurs, a test is made to determine if one or more local run-time environmental conditions are met, and if the conditions are met then the agent automatically applies one or more selectable configuration settings on the client system.

In another embodiment, a test is made if the client system is a portable computer as opposed to a desktop computer. When an event occurs, a test is made to determine if one or more local run-time environmental conditions are met, which includes the wildcard character, are met, and if the conditions are met then the agent automatically applies one or more selectable configuration settings on the client system.

More specifically, a GUI Manager is used by a network administrator to fill-in predefined templates. The administrator does not need to compile, debug or write a single line of scripting code. The GUI manager has a "select the box" and "point and click" and "fill-in the blank" approach for selecting computer settings. The predefined template or templates are used by a program on a client system to manage the configuration of resources on at least one client. There are three levels of resources that can be managed. The first type of resource is an operating system. The second level is a resource for an application. And the third type of resource is to redirect a resource on the client to a resource on a network such as a drive letter mapping. Resources include configurations from the group of configuration settings which consist of drive mappings, shell folders, printer deployment, proxy server access, application paths, service packs, anti-virus updates, policies and automatic mail profile creation.

In another embodiment validation logic is used on the clients' system during the execution of an application program that takes the template and applies the defined configuration settings in the template to the clients' system so as to automatically configure at least one configuration setting for a user if the combination of one or more predefined conditions for a selected group, a selected operating system and a selected connection method are met.

In still another embodiment, an interpretive engine is used on the client's system to permit the administration of client resources with a template while also allowing network administrators to build their own custom applications.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 7 is an example of using Boolean operators (AND, OR, NOT, XOR), according to the present invention

FIGS. 9A-9C are exemplary source code for carrying out the wildcard logic, according to the present invention.

FIGS. 11A-11B is an example of source code used for implementing laptop detection of FIG. 10, in an embodiment of the present invention.

DETAILED DESCRIPTION OF AN EMBODIMENT

Figure 1:
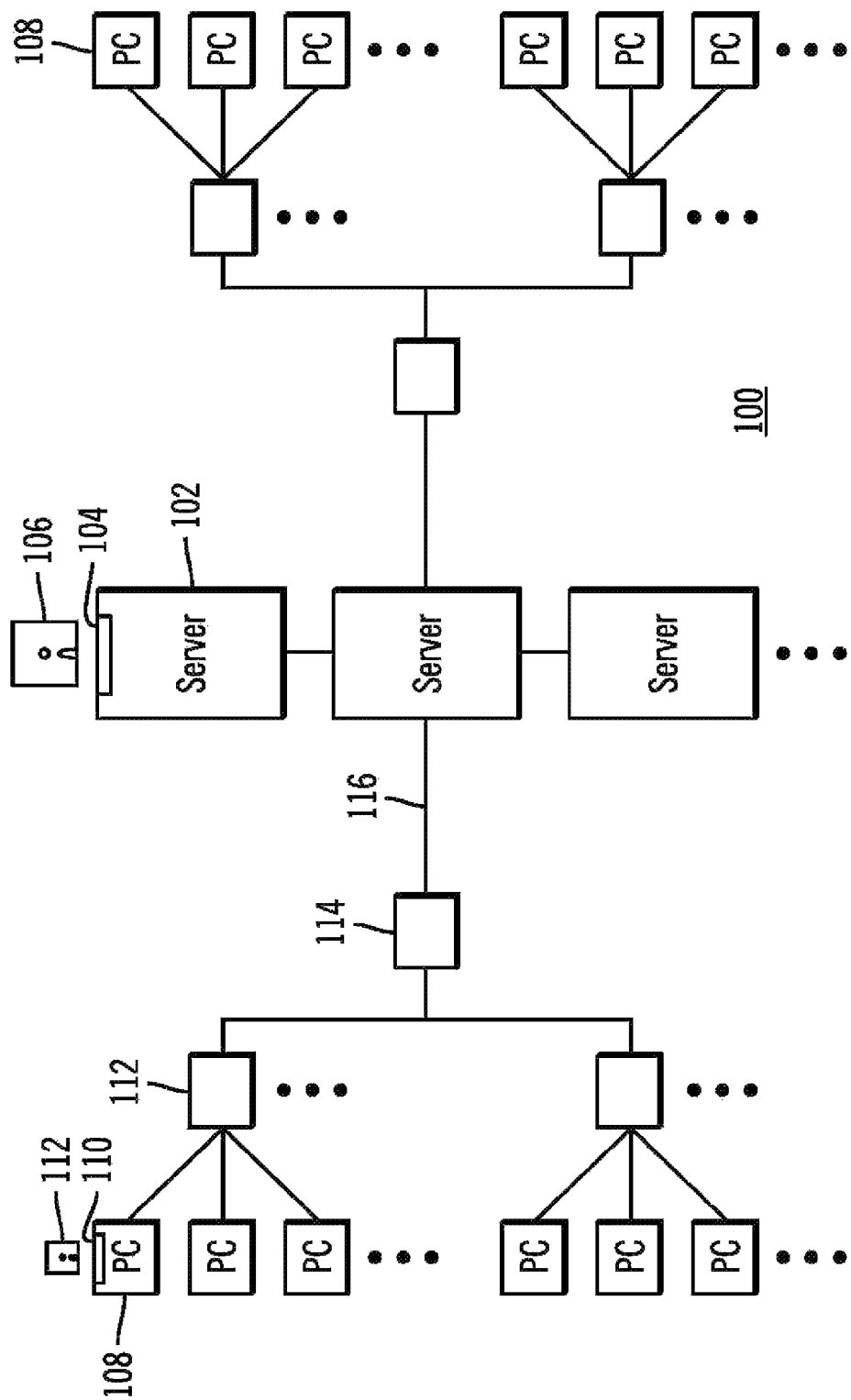
FIG. 1 is a block diagram of a client-server system for carrying out this present invention.

Glossary of Terms Used in this Disclosure

Many terms are defined in the attachments hereto and incorporated by reference in their entirety entitled "SCRIPT-LOGIC GETTING STARTED GUIDE" and "SCRIPT-LOGIC ADMINISTRATOR'S GUIDE", which are both available online from scriptlogic.com. Any conflict in terms that may exist between the appendix and this specification, the specification takes precedence.

agent/program—a program that gathers information or performs some other service without immediate presence and on some regular schedule. Typically, an agent program, using parameters you have provided, searches all or some part of the Internet, gathers information you're interested in, and presents it to you on a daily or other periodic basis.

configuration setting—a setting in an information processing system such as a PC during a boot-up and logon process. The configuration settings can be broken down into three categories. The first category is for setting an operating system that can include configuration settings for an operating system such as a 4-digit year, type of wallpaper, type of screen saver, 24-hour clock. The second category is for setting for one or more application such as mapping a default drive for a word processor's document files, the path of the backup files and the default open and save path for a word processor. The third category is for the mapping of a resource on a client to a resource on a network, such as a drive, CD ROM drive, tape drive or printer.

connection method—the method by which a client system is communicating to a server system. For example, is the client system physically wired to a network (e.g. LAN, RAS, VPN) or is the system dialing in over a telecommunications line or broadcast transmission (e.g. dial-up Networking).

group—a collection of users of user accounts. Groups are typically created to simplify the task of managing and defining rights for a large number of users. A user can belong to more than one group. For example, a user might belong to the manager group, the advisory group and the golf group. Another example is a sales team, human resources department where group definitions or memberships typically follow departments, workgroups and physical locations.

information processing system—a system capable of processing data and information and integrated with processes such as office automation and data communication. An information processing system can be embodied in a variety of hardware such as a PC, or microprocessor-based system.

interpreter or interpretive engine—a computer program that can interpret and execute statements in a source program without the performing intermediate steps of compiling the source program into machine language.

interpretive program language—the source programming language used by an interpretative engine.

local client run-time environment—one or more operating environment variables which are determined at client run-time, including but not limited to an operating system which is running, a MAC address, user name, workstation name, TCIP/IP address, host address, site, domain, connection method, whether the client system is a portable device or desktop device and any other setting not typically determined until the client system has started.

operating system—software that controls the execution of programs and that may provide services such as resource allocation, scheduling, input/output control, and data management and administration. Although an operating system is predominately software, partial hardware implementations are possible.

PC Card/PCMCIA—PC (previously known as a PCMCIA card) is a credit card-size memory or I/O device that fits into a personal computer, usually a notebook or laptop computer. Probably the most common use of a PC Card is the telecommunications modem for notebook computers.

portable system—a hardware device, such as a laptop, palm top, PDA or smartphone, which is designed to run on portable power supply such as a battery and is typically moveable with a user having its own keyboard and other input device and its own display. As contrasted with a desktop system where the power supply is connected to an electrical outlet and the display and keyboard are typically separate.

template—a structure for holding one or more settings to configure the runtime environment of a client information processing system which are independent of the operating system 306 running on the client computer.

user—a person requiring the services of an information processing system.

validation—the processes of testing one or more entries in a template against predefined boundary points, criteria or files.

wildcard—is a character in an entry that can stand for zero or more contiguous characters. The most commonly used wildcard characters are the asterisk (*), which typically represents zero or more characters in a string of characters, and the question mark (?), which typically represents any one character.

One Embodiment of a Network System for Running the Graphical Tool

FIG. 1 is a block diagram of a client-server system 100 for carrying out this present invention. A server information processing system 102 such as a PC server such as those available from IBM and Compaq or a server from Sun Microsystems or equivalent. The server 102 has an interface 104 for reading programming information from a computer readable medium 106 such as a floppy diskette, CD ROM, DVD ROM, Flash Memory or other removable computer readable medium. The server 102 is linked to a plurality of client information processing systems 104, such as a PC via a network 116 through gateway 114 and router 112.

In addition, one or more of the clients 108, may have an interface 110 for reading programming information from a computer readable medium 112 such as a floppy diskette, CD ROM, DVD ROM, Flash Memory or other removable computer readable medium.

Figures 2, 3:
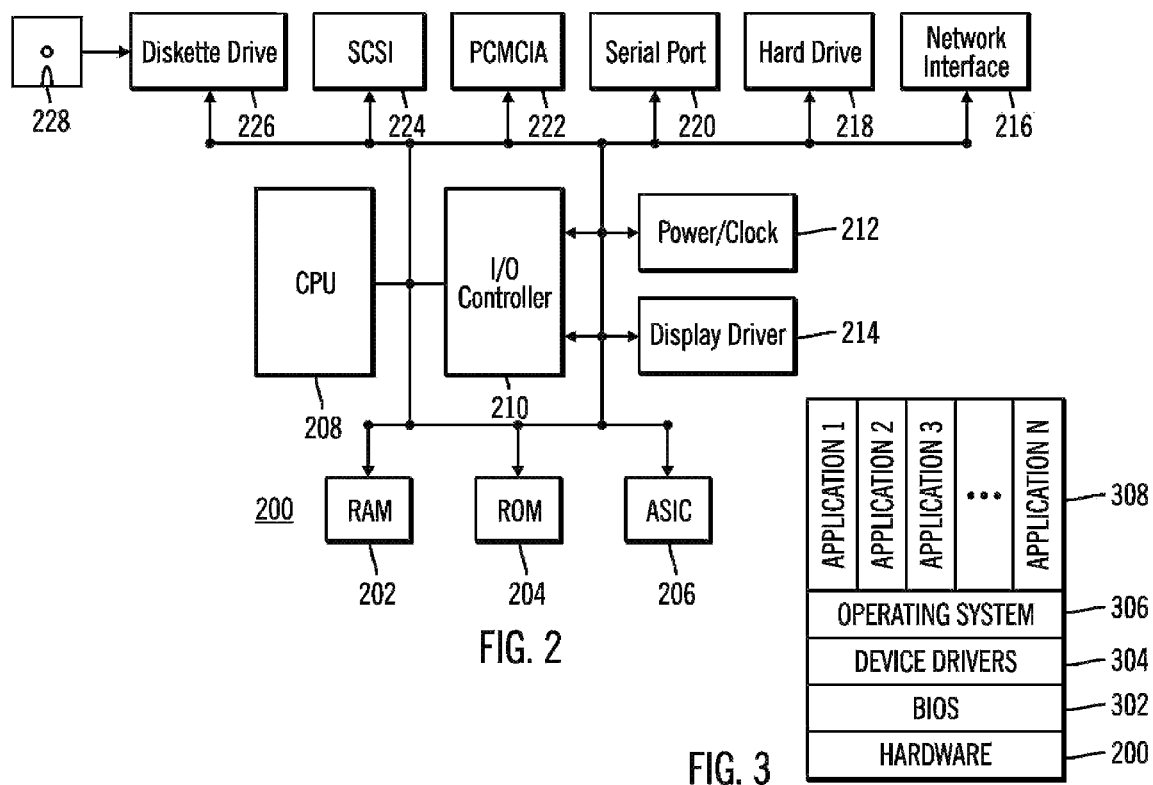
FIG. 2 is a block diagram of the major electrical components of an information processing system, according to the present invention.
FIG. 3 is a block diagram illustrating the software hierarchy for the information-processing device of FIG. 2, according to the present invention.

Referring to FIG. 2, there is shown a block diagram of the major electrical components of an information processing system 200 in accordance with this invention. The electrical components include: a central processing unit (CPU) 208, an Input/Output (I/O) Controller 210, a system power and clock source 212; display driver 214; RAM 202; ROM 204; ASIC (application specific integrated circuit) 206 and a hard disk drive 218. These are representative components of a computer. The operation of a computer comprising these elements is well understood. Network interface 216 provides connection to a computer network such as Ethernet, TCP/IP or other popular protocol network interfaces. Optional components for interfacing to external peripherals include: a Small Computer Systems Interface (SCSI) port 224 for attaching peripherals; a PCMCIA slot 222; and serial port 220. An optional diskette drive 226 is shown for loading or saving code to removable diskettes 228 or equivalent computer readable media. It is important to note that the system 200 can be implemented as any or all of the two information-processing components of FIG. 1, the client 108, the server 102.

The system 200 may be implemented by a combination of hardware and software. Moreover, the functionality required for using the invention may be embodied in computer-readable media (such as 3.5 inch diskette 228 or 106 or 112) to be used in programming an information-processing apparatus (e.g., a personal computer) to perform in accordance with the invention. Computer program means, or computer program, in the present context, means any expression, in any language, code or notation, of a set of instructions intended to cause a system having an information processing capability to perform a particular function either directly or after either or both of the following: a) conversion to another language, code or notation; b) reproduction in a different material form.

FIG. 3 is a block diagram illustrating the software hierarchy for the information processing system of FIG. 2 according to the present invention. The hardware 200 is the information processing system of FIG. 2. BIOS (Basic Input Output System) 302 is a set of low level of computer hardware instructions, usually stored in ROM 206, for communications between an operating system 306, device driver(s) 304 and hardware 200. Device drivers 304 are hardware specific code used to communicate between an operating system 306 and hardware peripherals such as a mouse, CD ROM drive or printer. Applications 308 are software application written in C/C++, Java, assembler or equivalent. Operating system 306 is the master program that loads after BIOS 302 initializes, that controls and runs the hardware 200. Examples of operating systems includes DOS, Palm OS, Pocket PC, Windows 3.1/95/98/Me/Millennium/NT/2000/XP, Linux, Unix, Macintosh, OS/2 and equivalent. In one embodiment, the graphical scripting tool is an application 308 that resides on the Server 102 and communicates with client 108 over the network 116. In another embodiment, the graphical scripting tool is an application 308 that runs on the client 108 that may be downloaded from the Server 102 such as a Java Application or loaded via computer readable medium 228 on the client 108. In yet another embodiment, the graphical scripting tool is a hybrid application 308 that exists both on the Server 102 and on the client 108. The graphical scripting tool operates in a stand-alone manner and communicates with the server 102 for submission of the intellectual property application.

The present invention can be realized in hardware, software, or a combination of hardware and software. The graphical scripting tool according to the present invention can be realized in a centralized fashion in one computer, or in a distributed fashion where different elements are spread across interconnected computer systems. Any kind of computer system—other apparatus adapted for carrying out the method described herein is suited. A typical combination of hardware and software could be a general-purpose computer system such that it carries out the methods described herein. The present invention can also be embedded in a computer program product, which comprises all the features enabling the implementation of the methods described herein, and which—when loaded in a computer system—is able to carry out these methods.

One Embodiment of a Graphical Tool Over-all Architecture

Figure 4:
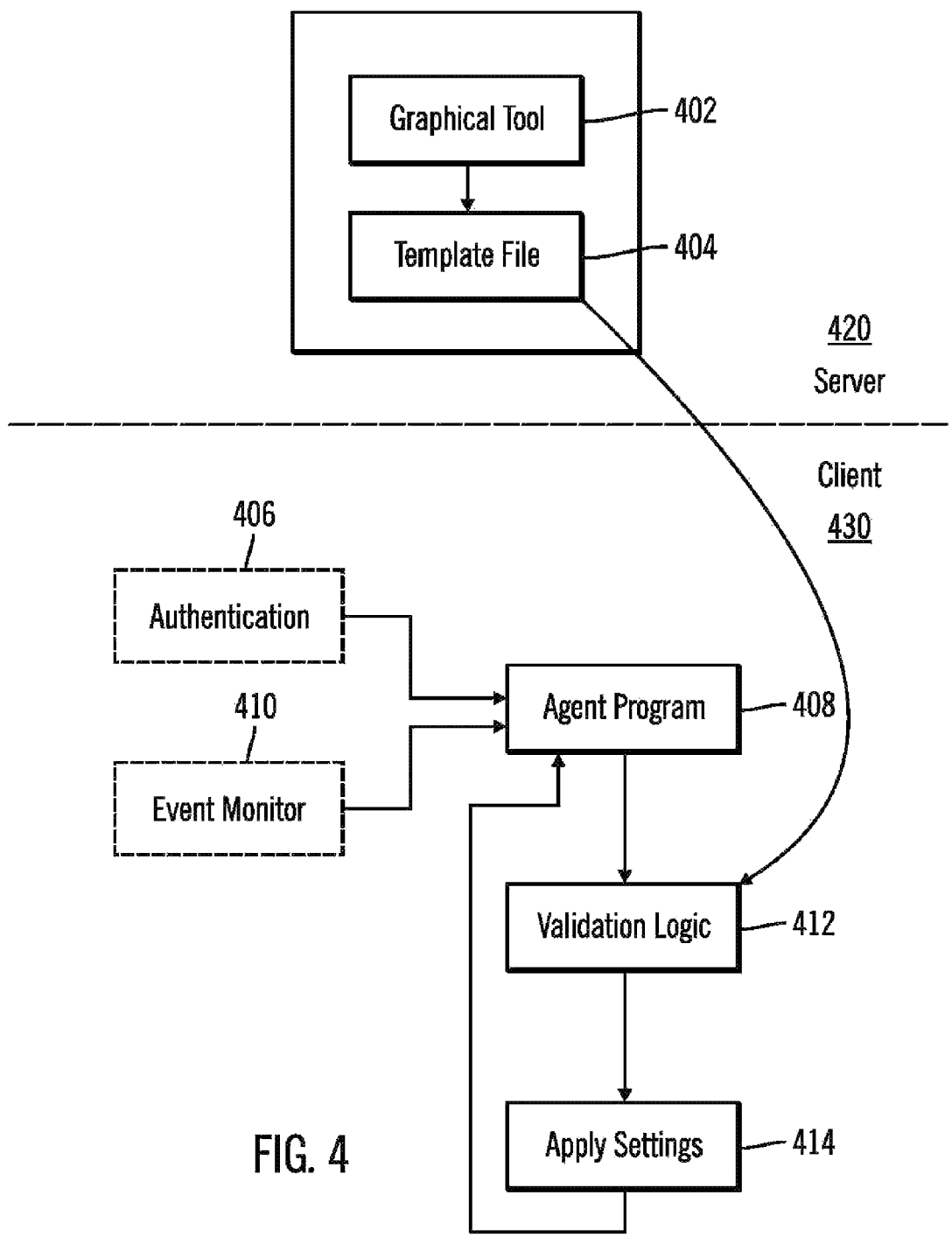
FIG. 4 is a high-level block diagram of the over all client-server graphical tool architecture, according to the present invention.

The present invention separates the validations of a local run-time environmental condition such as operating system type and the application of configuration settings on the client. This separation of validating of the local-run-time environmental conditions of a client with the application of settings permits very fine granularity of client configuration settings. Moreover, the validation logic is applicable to any configuration setting configurable at client run-time such as security policies, drive mappings, startup applications, registry settings, printer assignments, folder redirections, Internet Settings, desktop shortcuts, proxy configurations, application paths, Microsoft Office Paths, application settings, Microsoft Outlook/Exchange mail profiles, profiles, service packs, anti-virus updates, and other policies. The overall process of the Graphical Tool can be broken down into several discrete components some of which are optional (i) a server based graphical manager, (ii) (Optional) an authentication module, (iii) an agent/program running on the client; (iv) (optional) event monitor and (v) validation logic; and (vi) application settings. Shown in FIG. 4 is a high-level block diagram 400 of the over all client-server graphical tool architecture according to the present invention. The application 308 running on the server presents a GUI Manager 402. The GUI Manager 402 is used by a network administrator to configure settings and entries in templates 404. Besides storing the entries selected by the administrator, the template may also contain validation criteria (not shown) that tests to see if the entry is within a predetermined range. This validation criterion is used as a local run-time environmental condition as described further below. In one embodiment, the application 308 on the client 108 contains two components: an engine 408 and a program 406 that reads the settings in the templates 404 programs. In one embodiment, the program includes an engine (not shown). The engine in this embodiment is a commercially available interpretative engine. The KiXtart™ has been shown to be operate well but other engines or compiled languages can also used. Optionally, the program 406 may be encrypted by compiler so as to prevent unauthorized access or tampering by anyone using the tool or trying to change the logon settings of a client 108.

The GUI Manager 402 is the server side process 420, which is an intuitive GUI-based tool that provides the ability to centrally configure and save the configuration settings for the script component. The GUI Manager 402 stores configuration settings to a single file. Examples of the GUI Manger 402 are shown in the Appendix entitled ScriptLogic Administrator's Guide.

The client-side process 430 includes an optional authentication module. Typically a client computer 108 is powered-on, the BIOS points to an operating system to load and the user is presented a logon with a user name, and password and optional domain. Once the user authenticates to the network and/or computer, the operating system finishes loading and the user is presented a desktop (in Microsoft), the finder (in Mac), Window Manager (in Unix) or operating system shell in general.

Continuing further, an optional event monitor 410 is shown which triggers the agent/program 408 to begin the validation of the local runtime environment of the client 108. As will be further described below, an event is any processing system event such as startup, shutdown, logon, error message, application launch such as virus scan, period of user inactivity, a network connection or dis-connection, a hardware message, and/or other system events. The program uses validation logic 412 to determine if one or more of the conditions set in the templates 404 are met in the local runtime environment of the client 108. If one or more of the settings are met as required by the templates 404, the desktop and/or administrative settings from the template to the client are applied 414.

One Embodiment of Graphical Validation Logic Settings

Figure 5:
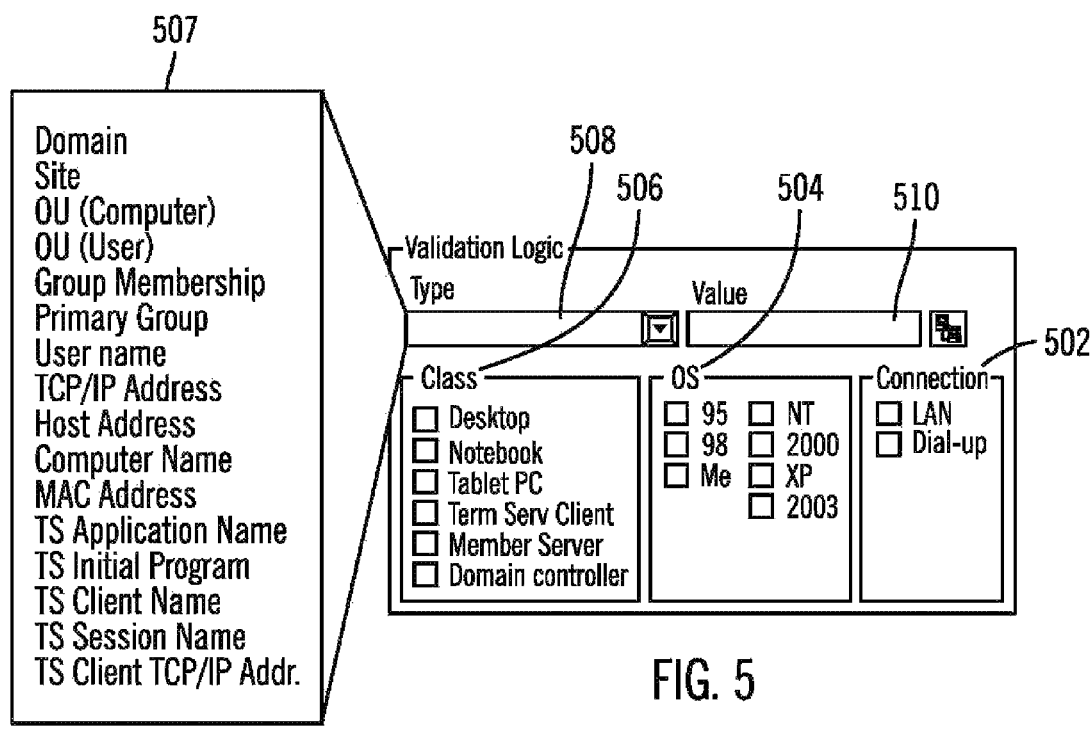
FIG. 5 is a screen shot of an exemplary GUI Manager for the validation logic, according to the present invention.

FIG. 5 is a screen shot of an exemplary GUI Manager 402 for the validation logic. The logic is broken down into connection method 502 (e.g., LAN and Dial-up), operating system 504 (e.g. Windows 95, 98, Me, NT, 2000, XP, 2003) and Class of Machine 504 (e.g. Desktop, Notebook or Portable, Tablet PC, Terminal Services Client, Member Server, Domain Controller) and the selected using of the GUI Manager 402 is checked. In the case that the particular selection does not meet a value 510 in one of these conditions 507 in the type 508 including but not limited Domain, Site, Organization Unit Computer (See Microsoft Corporation Group Policy Object), Organization Unit User, Group Membership, Primary Group, User Name, TCP/IP address, Host Address, Computer Name, MAC Address, Terminal Services (TS) Application Name, TS Initial Program, TS Client Name, TS Session Name, TS Client TCP/IP Address then the selection or setting is skipped. For example the template may request a certain drive letter for the client 108, say drive letter "O" to be mapped a particular resource, say a CD ROM on a server 102, however this can only happen if the user of the client 108 is a member of a particular group.

Exemplary Drive Settings Example Using Validation Logic

Figure 6:
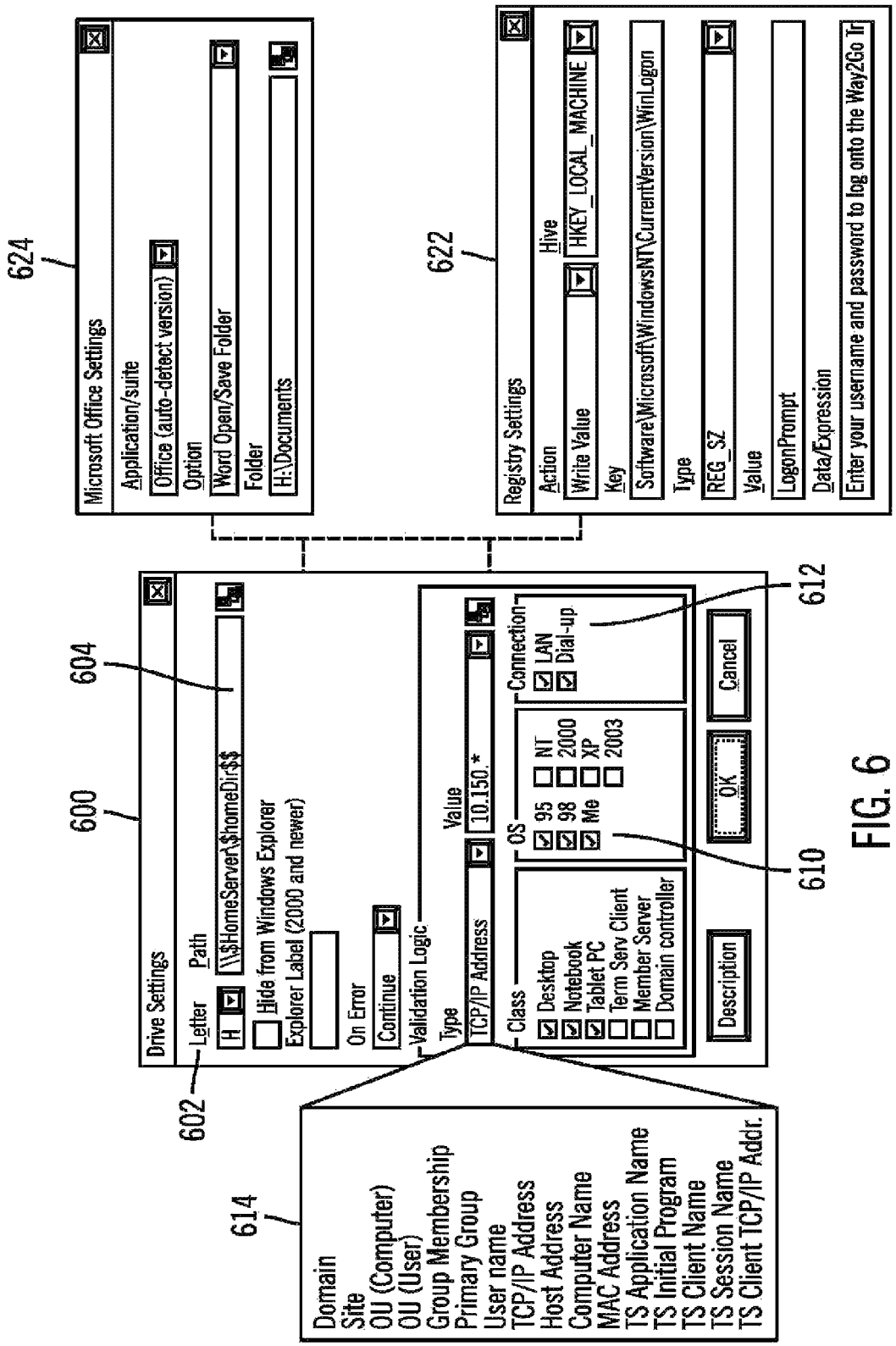
FIG. 6 illustrates a user screen for an example drive settings Drive Settings, according to the present invention.

FIG. 6 illustrates a user screen for an example drive settings Drive Settings 600. A pull down of possible drive letters 602 is selectable to share. The shared folder 604 is shown. In an optional embodiment, validation logic test to see if certain user selections are within predefined bounds. For example window 614 shows a window of the possible types with an address "10.150.". Check box 610 allows certain types of operating environment. In addition, the selection of Connection types of LAN or RAS (Remote Access Service) 612 is also shown.

Logical drive "H" 622 would only be mapped if the following conditions were met: the computer that the user is logging. onto has a TCP/IP address beginning with "10.150." and has "Windows 98" operating system installed and is directly connect to a LAN i.e., not connected using a dial-up connection. Likewise the same validation logic could be applied to Registry Setting and/or Application Setting such as Microsoft Office.

Also shown is the concept of using validation for drive settings 600 across other types of setting such as Microsoft Office Settings 624 and Registry Settings 622. This is important because the validation logic screen in FIG. 5 becomes available for use with different types of settings.

It is important to note that although the flow diagrams have depicted this graphical scripting tool to be used during logon and boot-up of the client system, it will be obvious to those of average skill in the art, that the occurrence of the scripting for configuration of one or more resources on a client 108 can occur at times other than boot-up and power-on.

Boolean Validation Logic Embodiment

FIG. 7 is an example of using Boolean operators (AND, OR, NOT, XOR) and conditionals (great than, less than, equal, parenthetical, IF-THEN-ELSE) with multiple types 508 of FIG. 5. In this embodiment, the validation logic is greatly expanded because combinations as defined by Boolean operators permit more complex testing. In addition, the validation logic with a hierarchical structure where the validation logic is nested in a tree of interrelated validation logic is available. The validation logic permits any level of granularity of types along with Boolean operators, where the types are understood to be any entry, typically determined at run-time on a client which validation uses to validate against.

Using the graphic tool of FIG. 7 allows the combinations of multiple validation logic types entries with Boolean operations and conditional operators to build a set of that validation logic as shown. The "Add" and "Remove" and "Or" and "And" and "Not" buttons on the tool of FIG. 7 allows the editing of each entry as required.

Validation Logic with Wild Cards

Figure 8:
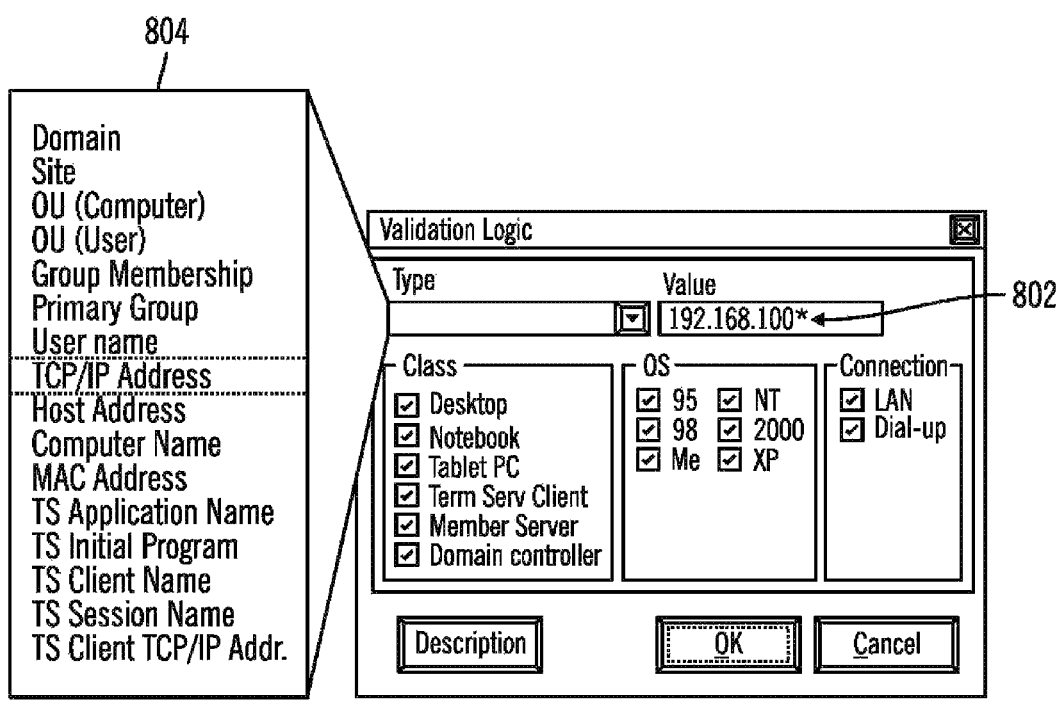
FIG. 8, is an example GUI of the validation logic of another embodiment with a 4-part validation logic scheme type, Class, Os, Connection and wildcard matching, according to the present invention.

In FIG. 8, the Validation Logic has been enhanced to not only use a 4-part validation logic scheme type, of Class, Os, Connection but also the addition of wildcard character matches is included. Wildcards include both the positional wildcard "?" and the length independent wildcard "*". Shown in FIG. 8 is a user of a wildcard to match the fourth octet of a TCP/IP address 802. It is important to note that this example only illustrates one wildcard example and other matches, and combinations are possible including combinations of asterisks and question marks within the true scope and spirit of the present invention.

FIG. 9A-9C are exemplary source code for carrying out the wildcard logic as shown in FIG. 8. This code would apply each component as described in step 412 of FIG. 4 above.

Event Driven

As an overview, the following enhancements occur in the process flow at sets. In this embodiment one or more agents 1–n in step 410 are configured and wait for an event. An event may be a system start-up, a logon, a period of user inactivity, a period of user inactivity in a given time window (e.g. Mondays after 5 PM and before 8 PM), a network connection, a process start/stop, an application start/stop, a virus detection, a hardware change, a message, a logoff, a shutdown or other triggering processes.

It is important to note that each agent 410 waits for an event before configuring the client 108. In one embodiment, more than one agent and more than one event are executing independently and each agent is waiting for a single event. For example, one agent applies updates to the OS when there is inactivity and this update is "run as" an administrator on the client. As another example, an agent connects a shared printer when the network is available. In one embodiment, the agent program has the given event to be tracked passed to it upon invocation and the program only returns when the given event has occurred.

In another embodiment, the event monitors a list for unauthorized applications such as Instant Messaging or Password crackers or games that a user on a client system may attempt to install. The unauthorized applications or alternatively the authorized applications are determined by the template file 404. If the Event Monitor 410 determines that an unauthorized application is being installed and/or executed, the Event Monitor 410 notifies the Agent Program 408, which in turn takes one or more actions such as disabling a process running the unauthorized program, sending an e-mail notification to an administrator, and/or locking access to the client system. This embodiment assists administrators by maintaining security and integrity of the desktop system and moreover reduces loss of productivity of a worker using an unauthorized game application.

Portable and Desktop Detection

In an embodiment of the present invention, the configuring process involves the ability to distinguish a portable (i.e., laptop) client computer from a non-portable (i.e., desktop) client computer. This is beneficial as only certain configuration settings are allowed (as per validation logic rules) for portable computers, as opposed to desktops. FIG. 5, for example, shows an exemplary user interface with check boxes 1006 to manage instances of a laptop client computer connecting to the network.

Figure 10:
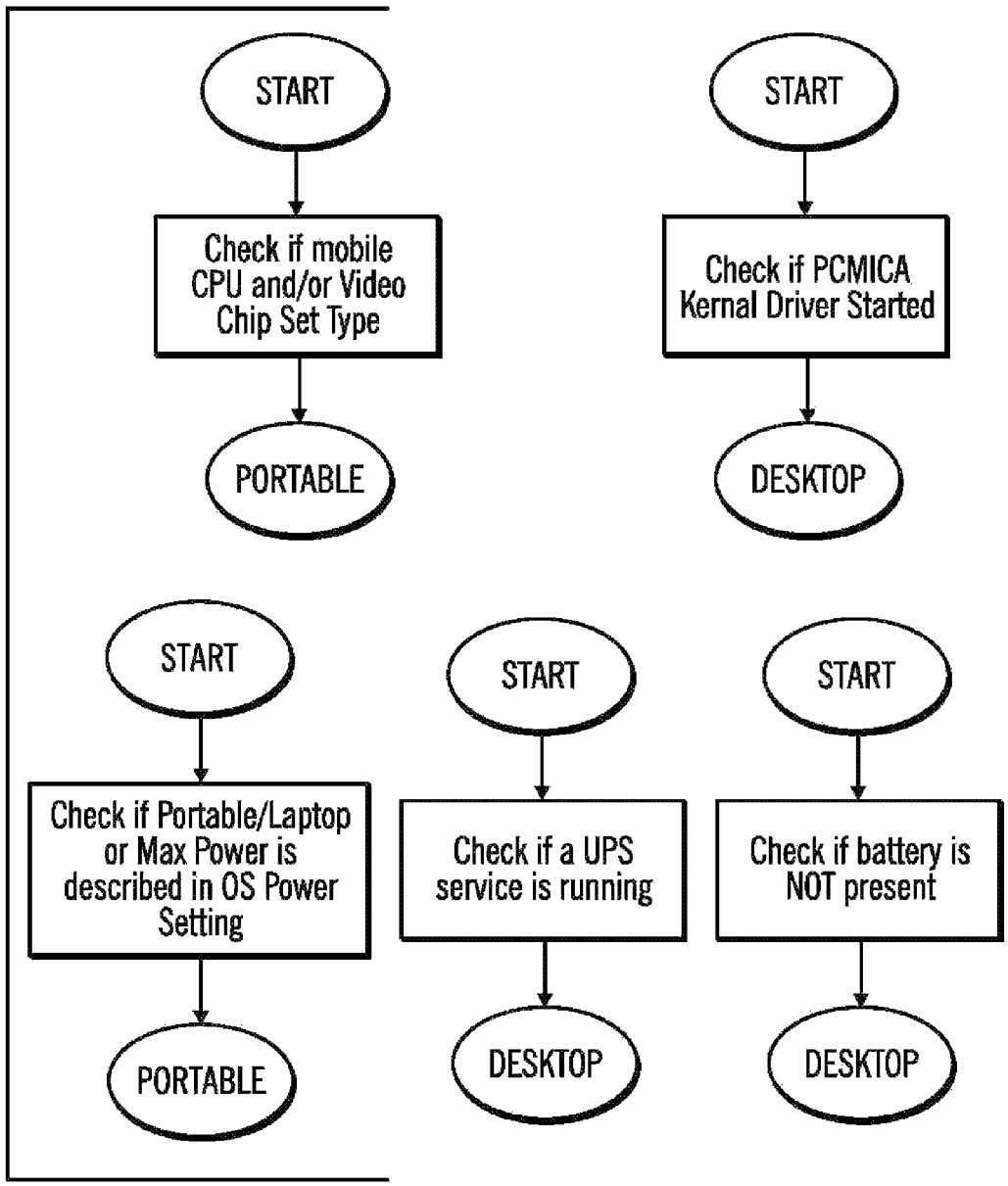
FIG. 10 is an exemplary flow of the detection of a portable computer, which may be accomplished in a variety of ways, according to the present invention.

FIG. 10 is an exemplary flow of the detection of a portable computer, which may be accomplished in a variety of ways. This includes detecting whether a CPU of the client computer is a mobile type, a PCMCIA drive is present in the client computer, a PCMCIA card or PC Card is inserted in a socket of the client computer, a docking station is present in the client computer, a battery is present in the client computer, an uninterruptible power supply is present in the client computer, and a power setting for a battery is present in an operating system of the client computer. Conversely, the detection of a non-portable computer may be accomplished by the absence of detecting any of the items described above.

The aforementioned description of the portable computer detection process conforms to a client-server paradigm as the client computer executes applications that perform these functions. In an embodiment of the present invention, the aforementioned description of the portable computer detection process conforms to a server-centric paradigm wherein the server is responsible for portable computer detection on the client computer. In this embodiment, the server remotely detects the presence of a portable client computer.

FIG. 11A-B are an example of source code used for implementing laptop detection in an embodiment of the present invention.

A couple examples may help assist to understand why it is so important to determine whether a system is a portable or a desktop. Having a network share assigned to a portable machine not connected to a network will cause the application to put up an error. For instance, it desirable to have applications such as Office suite products (word-processing, spreadsheet, database, presentation) to have a document path that is a network drive when connected to a network as a desktop but save to local drive if running as a portable. Likewise, configuration items such as Folder Redirection would often be set for desktop machines, but not for portable machines.

Another example would be when you want computers connected to the corporate network to be configured to access the Internet through a proxy server. Again, portable computers, when disconnected from the corporate LAN, would present a problem since they would retain the configuration to use a proxy server though no proxy server would be present. Here the determination of a portable class machine could be used to disable the need to use a proxy server when the user logs out or the machine is shut down.

CONCLUSIONS

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method in a client-server environment, to manage a configuration of resources on at least one client, the method on a client system comprising:

receiving a set of one or more configuration files from a server, the set of configuration files are identical to the set of configuration files received by other client systems attached to the server, and wherein the set of configuration files were previously built through use of a graphical interface, and without a need to create client specific logon scripts, and the set of configuration files contains at least one defined configuration setting; and in response to a logon authentication and at least one predefined runtime condition of at least one of a site and a domain being validated, executing an application program that takes the set of one or more configuration files and applies the defined configuration setting to the client system so as to automatically configure at least one configuration setting for at least one user on the client system, and wherein the application executes after the client system boots-up, loads an operating system and before an operating system shell is presented to the user.

2. The method in a client-server environment of claim 1, wherein the predefined runtime condition further includes at least one of a user name and a workstation name being validated.

3. The method in a client-server environment of claim 1, wherein the predefined runtime condition further includes at least one of a MAC address, a TCP/IP address, and a host address being validated.

4. The method in a client-server environment of claim 1, wherein the predefined runtime condition further includes at least an operating system version being validated.

5. A method in a client-server environment, to manage a configuration of resources on at least one client, the method on a server system comprising:

presenting a graphical user interface to a user containing user selectable items representing one or more configuration settings for at least one user on at least one client system and wherein the settings are customized without a need to create client specific logon scripts;

receiving one or more user selections on the graphical user interface;

storing the one or more user selections in a set of one or more configuration files so as to automatically configure for at least one user on the client system, at least one configuration setting, wherein the set of configuration files are identical to configuration files received by other client systems attached to a server; and transferring the set of one or more configuration files from the server over to the client system so at to cause an application program to take the set of one or more configuration files and apply at least one of the configuration settings to the client system so as to automatically configure for at least one user on the client system, at least one configuration setting, in response to at least one of a site and a domain being validated, and wherein the application executes after the client system boots-up, loads an operating system and before an operating system shell is presented to the user.

6. A client system to manage the configuration of at resource in a client-server environment comprising:

network interface circuit receiving a set of one or more configuration files from a server, the set of configuration files are identical to configuration files received by other client systems attached to the server, and wherein the set configuration files containing one or more defined configuration settings, wherein the configuration files were previously built through use of a graphical interface, and without a need to create client specific logon scripts; and in response to a logon authentication and at least one predefined runtime condition of at least one of a site and a domain being validated, network interface circuit executing an application program that takes the set of one or more configuration files and applies the defined configuration setting to the client system so as to automatically configure at least one configuration setting for at least one user on the client system, and wherein the application executes after the client system boots-up, loads an operating system and before an operating system shell is presented to the user.

7. The client system of claim 6, wherein the predefined runtime condition further includes at least one of a user name and a workstation name.

8. The client system of claim 6, wherein the predefined runtime condition further includes at least one of a MAC address, a TCP/IP address, and a host address being validated.

9. The client system of claim 6, wherein the predefined runtime condition further includes at least an operating system version being validated.

* * * * *

UNITED STATES PATENT AND TRADEMARK OFFICE
CERTIFICATE OF CORRECTION

PATENT NO.        : 7,912,929 B2
APPLICATION NO.   : 12/770354
DATED             : March 22, 2011
INVENTOR(S)       : Brian Styles Page 1 of 1

It is certified that error appears in the above-identified patent and that said Letters Patent is hereby corrected as shown below:

Column 1, line 13 please replace "COFIGURATION" with --CONFIGURATION--

Column 3, line 32 please delete "in";
Column 3, line 37 please delete "to manage" and replace with --for managing--;
Column 3, line 65 please delete "are met,"

Column 4, line 49 please delete "over all" and replace with --overall--

Column 8, line 34 please delete "be" after shown to;
Column 8, line 35 please insert --be-- after also Column 9, line 30 please delete "Drive Settings";
Column 9, line 41 please delete "." after logging;
Column 9, line 62 please delete "great" and replace with --greater--

Column 10, line 50 please delete "tracked"

Column 11, line 38 please insert --is-- after it

Column 12, line 48 please delete "at" and insert --as--;
Column 12, line 58 please delete "at" and insert --a--

Signed and Sealed this
Tenth Day of May, 2011

David J. Kappos
*Director of the United States Patent and Trademark Office*